Nov. 18, 1952 M. CAMRAS 2,618,710

RESILIENT MOUNT FOR MAGNETIC HEADS

Filed Aug. 30, 1947 3 Sheets-Sheet 1

Inventor
MARVIN CAMRAS
by The Firm of Charles Hill
Attys.

Nov. 18, 1952 M. CAMRAS 2,618,710

RESILIENT MOUNT FOR MAGNETIC HEADS

Filed Aug. 30, 1947 3 Sheets-Sheet 2

Inventor
Marvin Camras
by
The Firm of Charles W. Hills
Attys.

RESILIENT MOUNT FOR MAGNETIC HEADS

Filed Aug. 30, 1947 3 Sheets-Sheet 3

Inventor
MARVIN CAMRAS
by The Firm of Charles W. Hills
Attys.

Patented Nov. 18, 1952 2,618,710

UNITED STATES PATENT OFFICE 2,618,710

RESILIENT MOUNT FOR MAGNETIC HEADS

Marvin Camras, Chicago, Ill., assignor to Armour Research Foundation of Illinois Institute of Technology, Chicago, Ill., a corporation of Illinois Application August 30, 1947, Serial No. 771,492

2 Claims. (Cl. 179—100.2)

This invention relates to magnetic recording and reproducing apparatus, and more particularly, to a magnetic sound projector for motion pictures.

The use of a magnetic sound track on a moving picture film has been known for some time, and many suggestions have been made as to how it might be used in a motion picture projector so that the sound to accompany the moving picture might be reproduced from a magnetic sound track rather than from an optic sound track as is the common practice of the present day.

While many suggestions have been made, none of the known systems to date have been practical commercially. One of the chief complications of using a magnetic sound track on motion picture film lies in the fact that film easily changes its physical dimensions, and accordingly, it has been very difficult to have even reasonably good quality with any magnetic record made on a motion picture film.

One of the principal features and objects of the present invention is to provide a novel method and means for reproducing sound from a magnetic record made on motion picture film.

A further object of the present invention is to provide a novel magnetic recording and reproducing head and mounting therefor.

A further object of the present invention is to provide a novel method for shielding a magnetic reproducing head.

Another and further object of the present invention is to provide novel magnetic sound pick-up arrangement which is extremely small in construction, which is highly efficient in operation, and which is particularly effective when employed in conjunction with 8 mm. and 16 mm. moving picture film.

Another and still further object of the present invention is to provide a novel magnetic sound and moving picture projectors, having both magnetic and optic sound reproducing means.

The novel features which I believe to be characteristic of my invention are set forth with particularity in the appended claims. My invention itself, however, both as to its organization, method of operation, and manner of construction, together with further objects and advantages, may best be understood by reference to the accompanying drawings, in which:

Figure 1:
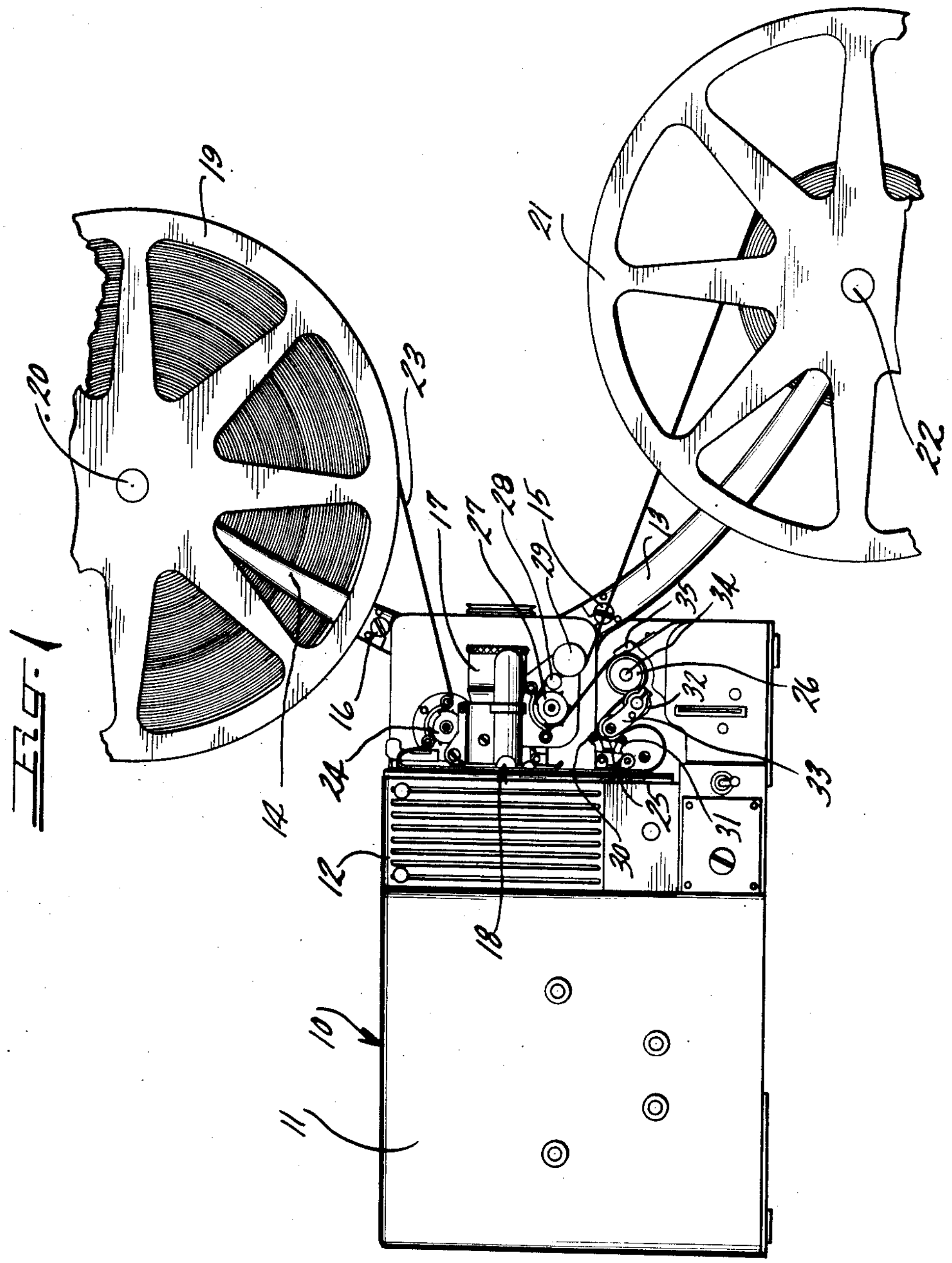
Figure 1 is a front elevational view of a magnetic sound and motion picture projector (with a portion of each of the two reels broken away) and which embodies certain of the novel principles and teachings of the present invention.

The sound projector 10 illustrated in Figure 1 of the drawings includes a main housing 11 which includes the motor for driving the various movable mechanical elements of the system, the audio amplifier for the sound system, and other conventional parts of a moving picture projector.

The housing 11 also includes a supplemental housing 12 which contains the projection lamp. Mounted on the forward part of the housing 11 are a pair of removable reel arms 13 and 14 which are secured to the main frame of the machine by lock screws 15 and 16, respectively.

The main lens 17 is mounted at the front of the gate mechanism 18. The supply reel 19 is mounted on a spindle 20, while a take-up reel 21 is mounted on a spindle 22. The spindle 22 is driven through an endless loop drive member (not shown) mounted within the arm 13.

The moving picture film 23, as shown, is being unwound from the supply reel 19 and wound up on the take-up reel 21. The film 23 passes over a sprocket wheel 24 which is driven at a substantially constant speed and then passes through the gate mechanism 18. It then passes back in a half-loop over a roller 25 and then down around a rotary stabilizing element 26. After leaving the rotary stabilizing element 26, it passes up over a sprocket wheel 27 down over a stripper stud 28 and over a guide roll 29. The film, in passing over the roller 25, is held in place by two small rollers 30 and 31. The film 23 in passing over the rotary stabilizer 26 is held in place by a tension roller 32 which is carried on the arm 33 hinged about the axis of rotation of the roller 25.

The tension roller 32 is spring-biased (not shown) in a counter-clockwise direction about its pivot point, thereby to cause the tension roller 32 to be constantly urged against the rotary stabilizer 26.

The rotary stabilizing element 26 is mounted on a shaft 34 and is either of substantial mass itself, thereby to act as an inertia member, or else has an additional inertia member (not shown) mounted on the shaft 32 within the housing 11. The shaft 34 is a freely rotating shaft, and hence the rotary stabilizing element 26 is driven by the film 23 as it rides thereon. The magnetic sound head engages the sound track of the film 23 as it passes over the rotary stabilizing element 26. This insures substantially constant linear speed of the film sound track as it passes the recording and reproducing head.

As may be seen best in Figure 2 of the drawings, the sound head assembly 35 is mounted on a shoulder formation 36 which lies below the rotary stabilizing element 26.

Figures 2, 3, 4, 8:
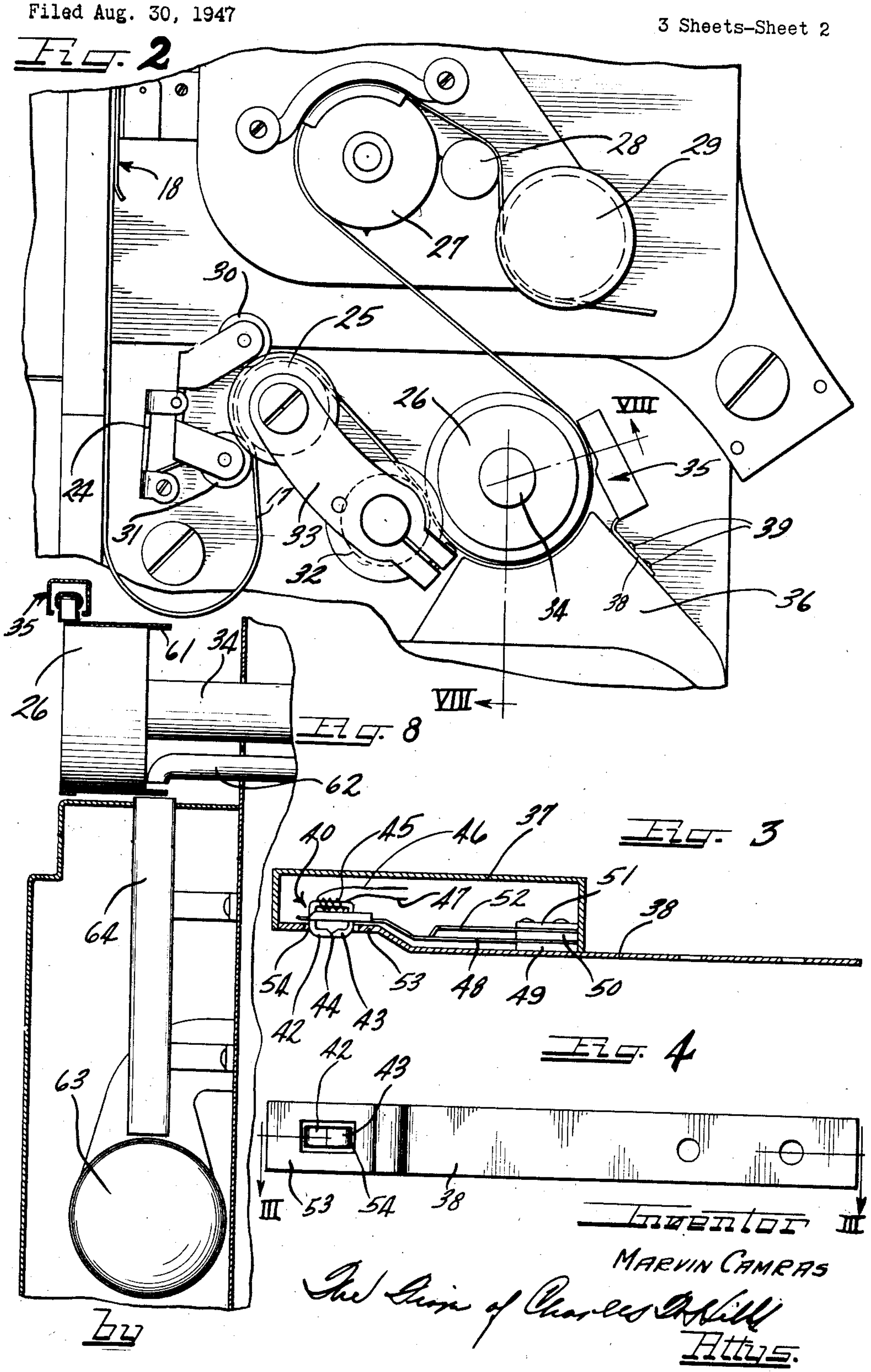
Figure 2 is a greatly enlarged elevational view of the film drive mechanism immediately below the lens.
Figure 3 is a still further enlarged sectional view through the reproducing head housing and mounting, as taken along the line III—III of Figure 4.
Figure 4 is a bottom view of the reproducing head mounting and housing.
Figure 8 is a sectional view taken along the line VIII—VIII of Figure 2.

As may be seen best in Figures 3 and 4 of the drawings, the sound head assembly 35 includes a housing 37 which is mounted on an arm 38 which is bolted or riveted as at 39 to the shoulder formation 36 of the housing. The housing 37 and the arm 38 are preferably made of steel or other suitable magnetic material so as to act as a shield for the head 40 which is mounted within the housing 37. The head 40 includes a core member 41 having two confronting leg portions 42 and 43 which terminate in closely spaced confronting relationship to each other to define a gap 44. A signal coil 45 is wound on the core 41 and connects through leads 46 and 47 to the amplifier (not shown).

The head 40 is mounted on a long flat leaf spring 48 which is supported at one end between blocks 49 and 50. A third block 51 also holds in place a second leaf spring element 52 which bears against the spring 48 and acts as a dampening element as well as to stiffen its action somewhat. This, of course, takes place as a result of the sliding friction of the downturn end of spring 52 against spring 48 when spring 48 is flexed.

The lower side of the housing 37 is, of course, covered by the mounting plate 38 and includes an off-set portion 53 which is provided with an opening 54 through which a small portion only of the core 41 of the head 40 projects.

As may be seen best in Figure 4, the opening 54 is only slightly larger than the leg portions 42 and 43 of the core 41 which projects therethrough. It will thus be seen that the head on its leaf spring or cantilever spring mounting 48 is free for limited movement but is prevented from damage from sudden blows since the head 40 is protected from top blows, side blows and end blows by housing 37, and bottom blows are restrained by the member 38 after a relatively small movement of the head 40. It will further be observed that the head 40 is magnetically shielded by the housing 37 from stray magnetic fields such as might be present from the drive motor of the projector unit.

Figures 5, 6, 7:
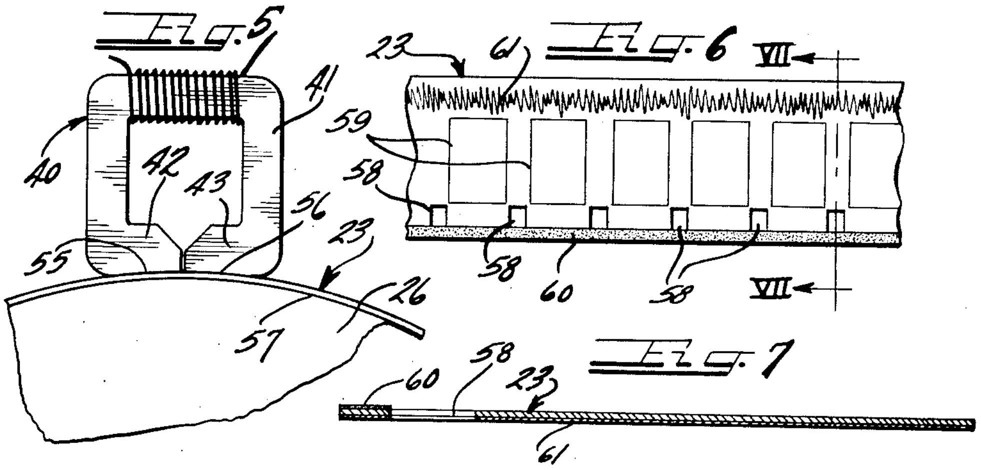
Figure 5 is a greatly enlarged fragmentary view of the recording head core as the film passes over the rotary stabilizer.
Figure 6 is a diagrammatic illustration of a piece of film with both a magnetic sound track thereon and an optic sound track thereon.
Figure 7 is a greatly enlarged sectional view of the film shown in Figure 6 as taken along the line VII—VII of Figure 6.
Figure 9:
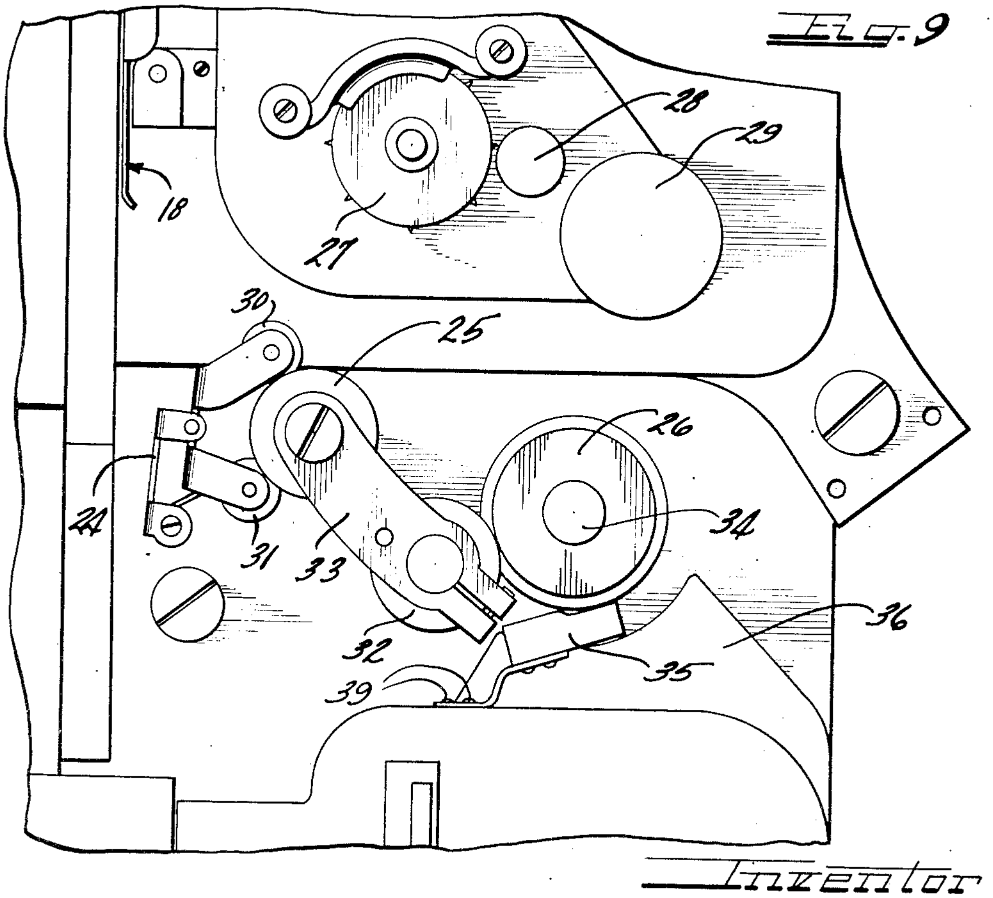
Figure 9 is a view similar to Figure 2, but illustrating a modified form of the present invention wherein the reproducing head is mounted directly below the rotary stabilizer.

The pole portions 42 and 43, as may be seen best in Figure 5, are slightly concave over their lower surface as at 55 and 56 so as to conform to the curvature of the cylindrical surface 57 of the rotary stabilizing element 26.

The film 23 is illustrated in an enlarged view in Figure 6, and a still further sectional enlargement appears in Figure 7.

As shown in Figure 6, the film 23 includes a row of sprocket holes 58 going down one side of the film in a position located between the picture frames 59 and an outer edge of the film. A magnetic sound track 60 is placed between the sprocket holes 58 and the adjacent edge of the film. This sound track 60 may be formed of powdered ferromagnetic material having relatively high coercive force which is bonded or otherwise suitably secured to the surface of the film 23 opposite to that which carries the emulsion 61 (see Figure 7).

The head 40 bears against the magnetic sound track 60 of the film 23, as the film 23 rides over the rotary stabilizer 26. It is maintained in firm but constant contact with the sound track 60 by virtue of the resiliency of the spring arm 48, and if any irregularity occurs on the film, the head 40 merely rides over the irregularity due to the shape of the ends of the leg portions 42 and 43 and the manner in which they are mounted on the spring arm 48. Any movement of this character which occurs is damped by the damping spring 52.

The projector 10 also includes means for the optical reproduction of sound. The film 23 as shown in Figure 6 of the drawings includes the usual optical sound track 61 which lies along the opposite edge of the film 23 from that in which the magnetic sound track 60 is disposed. The optical sound track 61 is on the portion of the film 23 which overhangs the rotary stabilizing element 26 as shown in Figure 8 of the drawings.

In Figure 8 of the drawings, the film has been broken away where it wraps partially around the rotary stabilizing element 26. The light transmitting element 62 of the projector 10 transmits light from the lamp 63 after it passes through the sound track portion 61 of the film to the light-sensitive element (not shown) which is located at the opposite end of the member 62. Interposed between the lamp 63 and the film 23 is another light focusing and transmitting member 64.

The particular details of the optic end of the present system are only diagrammatically illustrated, since the details of this phase of the projector may be any conventional optical sound system, it being remembered that it is the combination of this optical sound system with the magnetic sound system which forms one of the features of the present invention.

While I have shown a particular embodiment of my invention, it will, of course, be understood that I do not wish to be limited thereto, since many modifications may be made, and I, therefore, contemplate by the appended claims to cover all such modifications that fall within the true spirit and scope of my invention.

I claim as my invention:

1. In combination with a motion picture projector arranged for reproducing sound from a film having a magnetic sound track, means for imparting a constant speed to said film through said projector, a rotary stabilizing element on said projector over which said film rides, an electromagnetic transducer head in resilient engagement with said sound track, said transducer head including a pair of confronting pole portions, a spring member urging said pole portions into contact with said sound track, and a second spring member engaging said first spring to dampen the vibrations of said head upon contacting irregularities in the film as the film rides over said stabilizer.

2. In combination with a motion picture projector arranged for reproducting sound from a film having a ferromagnetic sound track, means for imparting a constant speed to said film through said projector, a rotary stabilizer on said projector over which said film rides, a pinch roll holding a portion of said film against said stabilizer, an electromagnetic transducer head in resilient engagement with the sound track, said transducer head including a housing having an opening therein opposite said stabilizer, a pair of confronting pole portions freely extending through said opening, a leaf spring urging said pole portions into contact with said sound track, and a second spring member engaging said first spring to damper the vibrations of said head when said pole portions contact irregularities on the film as said film rides on said stabilizer.

MARVIN CAMRAS.

REFERENCES CITED

The following references are of record in the file of this patent:

UNITED STATES PATENTS

| Number | Name | Date |
|---|---|---|
| 897,765 | Morin | Sept. 1, 1908 |
| 1,612,359 | Chipman | Dec. 28, 1926 |
| 1,808,046 | Kuchenmeister | June 2, 1931 |
| 1,827,588 | Kellogg | Oct. 13, 1931 |
| 1,877,731 | Kuchenmeister | Sept. 13, 1932 |
| 1,949,409 | Cohen | Mar. 6, 1934 |
| 2,037,972 | Gillet | Apr. 21, 1936 |
| 2,042,027 | Simons | May 26, 1936 |
| 2,093,769 | Zillger | Sept. 21, 1937 |
| 2,363,497 | Begun | Nov. 28, 1944 |
| 2,410,569 | Conant | Nov. 5, 1946 |
| 2,418,543 | Camras | Apr. 8, 1947 |

FOREIGN PATENTS

| Number | Country | Date |
|---|---|---|
| 69,273 | Norway | May 28, 1945 |
| 389,434 | Great Britain | Mar. 16, 1933 |
| 442,425 | Great Britain | Feb. 7, 1936 |
| 858,206 | France | Nov. 20, 1940 |